Sept. 18, 1928.  
H. P. HAYDEN  
1,684,624
CONCRETE CONSTRUCTION
Original Filed May 17, 1926  2 Sheets-Sheet 1
FIG. I
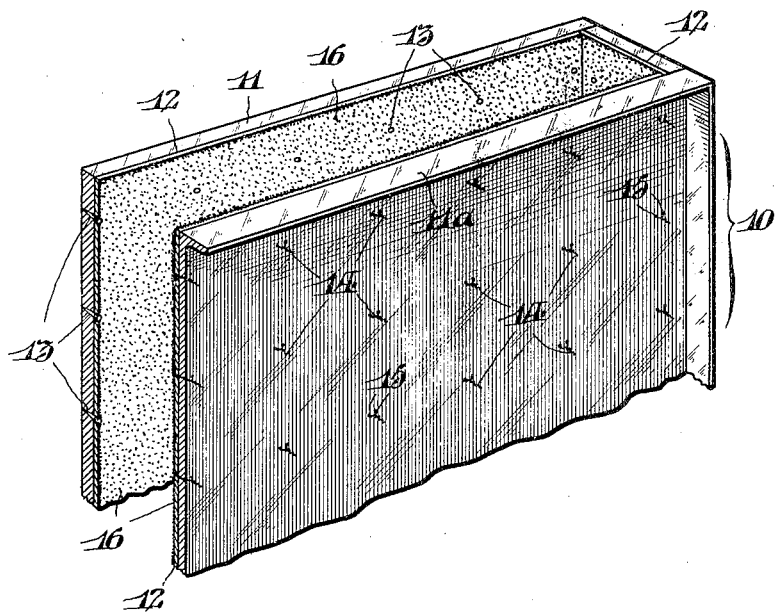
FIG. II.
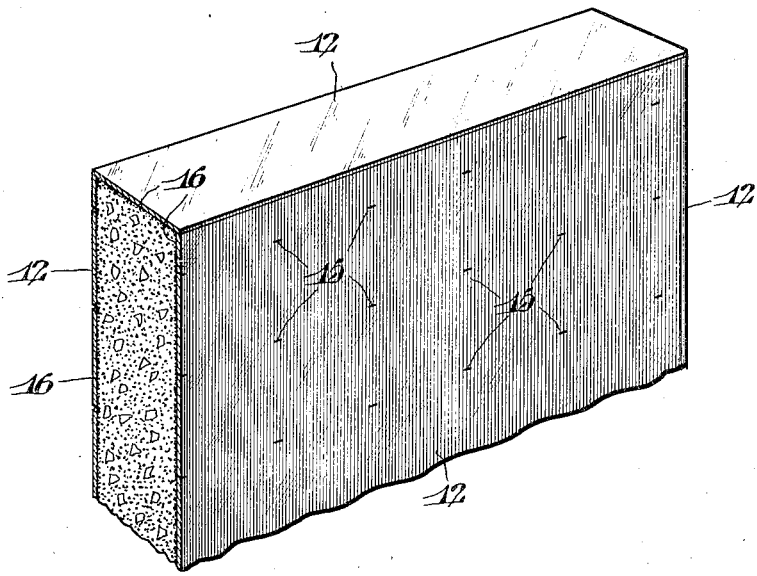
WITNESSES  
Thomas W. Kerr, Jr.  
Parris M. Twesten
INVENTOR:  
Harold P. Hayden,  
BY Fraley & Paul  
ATTORNEYS.

Sept. 18, 1928.
H. P. HAYDEN
1,684,624
CONCRETE CONSTRUCTION
Original Filed May 17, 1926　　2 Sheets-Sheet 2
FIG. III.
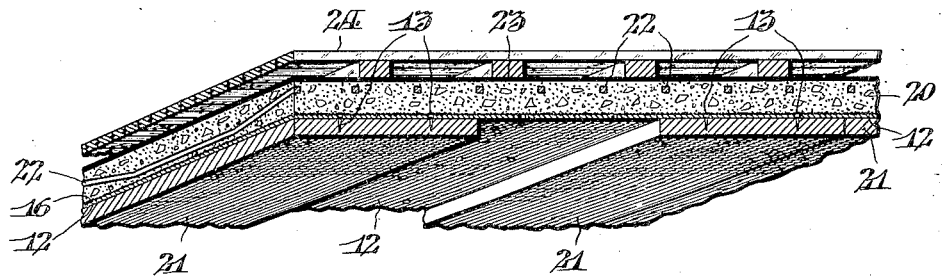
FIG. IV.
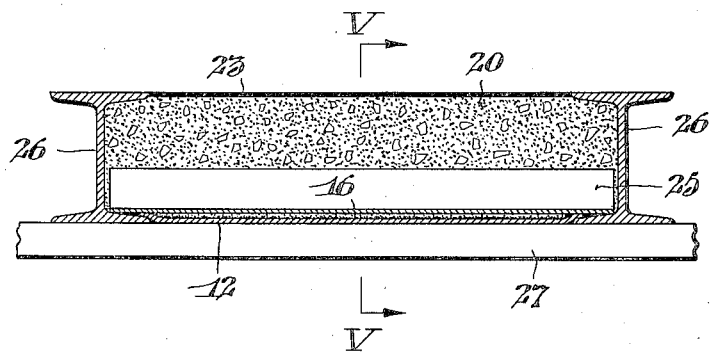
FIG. V.
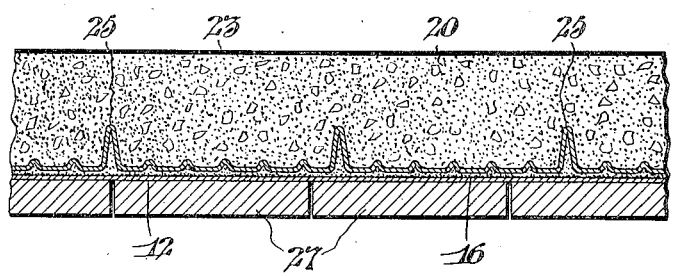
WITNESSES
Thomas W. Kerr Jr.
Parris M. Swester
INVENTOR:
Harold P. Hayden,
BY Fraley & Paul
ATTORNEYS.

Patented Sept. 18, 1928.

1,684,624

UNITED STATES PATENT OFFICE.

HAROLD P. HAYDEN, OF WOODBRIDGE, NEW JERSEY, ASSIGNOR TO THE BARBER ASPHALT COMPANY, OF PHILADELPHIA, PENNSYLVANIA, A CORPORATION OF WEST VIRGINIA.

CONCRETE CONSTRUCTION.

Application filed May 17, 1926, Serial No. 109,522. Renewed July 16, 1928.

My invention relates to concrete construction, my aim being to enhance and protect the effective strength of concrete work. Other advantages obtainable through the invention include damp and waterproofing, where required, without extra cost. How the foregoing and still other advantages can be realized through the invention will appear from my description hereinafter of a selected and preferred way of carrying it out practically.

The strength and other properties of concrete are to a large degree determined by the influence of water, when present as absorbed moisture, as well as when definitely combined with the hydraulic cement in the concrete. This is true both as regards the curing of the concrete when first poured or molded, and as regards the subsequent period, after setting and curing have (so far as now understood) been completed.

For example, it has been found that concrete kept damp after pouring and setting increases in compressive strength 75% during the first ten days, 115% in the first three weeks, and 145% by the end of the first four months. However, it is often difficult and expensive to make sure of keeping concrete work thoroughly and uniformly damp for a period adequate for the best curing effects, so that it is rarely safe to rely on concrete for the full measure of strength that would result from such substantially complete curing.

As regards behavior after curing, the pronounced effect of moisture on the linear dimensions and volume of concrete are illustrated by the fact that a concrete member 100 ft. long, for example, may lengthen or contract as much as 5 in. with variations in its moisture content. Such variations in dimension necessarily produce very considerable stresses in concrete work, especially in cases where the moisture content of a structure comes to be different (or varies differently) in different parts, and in the case of reinforced concrete members and structures. In this latter case, the expansion of the concrete due to absorption of moisture may be (and usually is) directly and powerfully resisted by the steel reinforcement, so that eventual cracking and weakening of the concrete becomes inevitable.

I aim to overcome all such irregularities, uncertainties, and other ill effects connected with the presence and amount of water (whether combined or merely absorbed) in concrete, preferably in a very simple and convenient manner. In the curing period, I aim to assure adequate moisture for the best effects; while subsequently, I aim to do away with or minimize stresses and variations in dimensions due to the presence of varying amounts of water. All this I accomplish not (as might be supposed) by continually supplying the concrete with water during curing, or by rigorously excluding water from it afterward, but rather by confining and stabilizing the water content, so as to prevent loss thereof and minimize variations due to changing atmospheric conditions. For these and other purposes, I sheath or enclose the concrete structure in a substantially or more or less impervious covering, suitably affixed, so as to prevent or retard changes in moisture content,—all, preferably, as hereinafter described with reference to the accompanying drawings.

In the drawings, Fig. I is a fragmentary perspective view of a concrete mold prepared for the practice of my invention.

Fig. II is a perspective view of molded concrete work produced as illustrated in Fig. I.

Fig. III is a fragmentary broken and perspective view of a concrete floor constructed in accordance with my invention.

Fig. IV is a section illustrating the molding of a concrete floor, with certain variations from the showing of Fig. III, and Fig. V shows a section at right angles to Fig. IV, taken as indicated by the line V—V in that figure.

In Fig. I of the drawings is shown a mold or form 10 for concrete work: it may be of any suitable or preferred form, material, and construction, according to the character of the concrete member or structure to be produced in it, etc. In the present instance, it is shown as comprising a couple of upright panels or form sections 11, 11ª, suitably spaced apart for casting a wall. This mold 10 is lined with a covering 12 for the concrete structure to be produced, consisting of sheets detachably secured to the inner surfaces of the forms 11, 11ª, as by means of small nails 13 (casing nails) driven into the wooden plank form 11 at rather wide intervals, or of wires 14 looped and tied through holes 15, 15 in the sheet metal form 11ª, likewise at considerable intervals. The material 12 is preferably applied to every wall of the mold cavity corresponding to a surface of the molded concrete structure that will be exposed to take up or lose moisture. The sheet material 12 may conveniently be applied to the forms 11, 11ª before they are set in place or assembled as shown in Fig. I. On its inner side, exposed to the concrete in the mold 10, this material 12 is provided with anchorage means 16, adapted to adhere or be embedded, and tie the material 12 to the cement or mortar of the concrete.

The material 12 which I at present generally prefer is a bituminated fabric similar to prepared roofing, particularly that known commercially as "bituminous stucco base". This latter consists of a fabric like bibulous paper felt ("rag felt") saturated and coated with an asphalt compound, and surfaced on one side with a rather coarse grit,—which is sprinkled and pressed into the asphalt coating while the latter is still hot and soft. In general, a coarser grit is used for stucco base than for mineral-surfaced roofing, in order to afford a better "tooth" for holding stucco, plaster, or other mortar. Granules of crushed calcite are often used on stucco base, and when turned inward toward the concrete, as already described, they make a very good anchorage 16 for my purpose.

Inasmuch as the concrete when poured into the mold 10 will press the material 12 firmly against the mold walls, it is only necessary to secure the material 12 rather loosely to the panels 11, 11ª, as described above, so as to hold it in place until the concrete is poured and permit it to be easily detached afterward. As soon as the concrete has set sufficiently to do without the support of the mold 10, the latter is removed, thus leaving the concrete completely sheathed or encased in the adherent covering 12, as shown in Fig. II. The sheathing 12 is then held firmly by the cement in the concrete, and is securely anchored by the grit 16. As shown in Fig. II, the top of the molded concrete structure is also sheathed with a strip of the covering material 12, applied (granule side down to the concrete) at a suitable stage: e. g., to the floated cement with which the fresh-poured concrete is usually topped off in the mold, before the initial set has occurred.

Fig. III illustrates the application of my invention to a concrete floor 20, poured on a platform mold of panels 21, and provided with metal reinforcement 22 embedded in the concrete. As shown, one of the floor panels has been removed to expose the stucco base sheathing 12 that has been laid over the bottom of the mold, grit up, before the pouring of the concrete, and has become anchored to the latter. Instead of being topped with stucco base 12 as in Fig. II, the floor 20 is covered or sheathed with a coating of bitumen 23 (such as the asphaltic emulsion known as "cold repair cement"), applied to the green, freshly poured concrete. In the case of a floor thus topped, ultimate protection against wearing away of the bitumen is, of course, desirable,—as by wood flooring 24 laid over the concrete.

Figs. IV and V illustrate the application of my invention to floor construction where "Truscon Hyrib" 25, supported by I-beams 26, is used in lieu of a bottom form. Here the stucco base 12 is held in place by suitable falsework 27 during the pouring and setting of the concrete, which covers the lower side of the "Hyrib" 25 to secure the stucco base 12.

By imperviously sheathing the fresh, green concrete with bitumen substantially when poured, as above described, evaporation from the concrete during curing in effectually prevented; so that to assure proper curing, it is only necessary to mix the concrete with a suitable amount of water (i. e., not less than required for complete curing) in the first place. Accordingly, the more or less difficult and costly measures heretofore required to provide moisture during the curing period are unnecessary. Uniform, definite curing and correspondingly increased uniform strength being thus dependably assured, concrete structures and members may be made less massive than would otherwise be necessary, and therefore lighter. Remaining on the structure indefinitely, the impervious sheathing prevents or retards variation of the moisture content of the concrete with varying weather conditions, etc., and thus prevents corresponding expansion or contraction and internal stresses. It also obviates all need of other dampproofing or waterproofing,—even, in general, in cases where the concrete is subject to hydrostatic head.

Having thus described my invention, I claim:

1. The method of curing concrete and stabilizing its water content which comprises completely and imperviously sheathing it, when poured, in a permanent bituminous covering.

2. The method of curing concrete and stabilizing its water content which comprises completely and imperviously sheathing it, when poured, with a permanent affixed covering of bituminated fabric.

3. The method which comprises molding concrete work in a mold lined with bituminated fabric having anchorage means at its side toward the concrete, thereby completely and permanently sheathing the concrete with the fabric and confining and stabilizing the water content of the concrete.

4. The method which comprises molding concrete in a mold lined with grit-surfaced bituminous stucco base having its grit side toward the concrete, thereby adherently sheathing the concrete with the fabric completely and permanently.

5. The method which comprises comprises completely lining a concrete mold with grit-surfaced bituminous stucco base, loosely secured to the interior of the mold with its grit side inward; casting concrete in the lined mold and allowing it to set; and removing the mold, leaving the stucco base permanently fast to the concrete.

6. As an article of manufacture, concrete work completely imperviously, and permanently sheathed, when poured, in a bituminous covering.

7. As an article of manufacture, concrete work completely and permanently sheathed with an affixed covering of bituminated fabric.

8. As an article of manufacture, concrete work completely and permanently sheathed with an adherent covering of bituminous fabric held to the concrete by the cement in the latter.

9. As an article of manufacture, concrete work completely and permanently sheathed with a covering of grit-surfaced bituminous stucco base anchored to the concrete by the grit.

10. The method of curing concrete and stabilizing its water content which comprises completely and imperviously sheathing it, when poured, in a bituminous covering and permitting the covering to remain and form a part of the structure formed by the concrete.

In testimony whereof, I have hereunto signed my name at Madison, State of Illinois this 4th day of May, 1926.

HAROLD P. HAYDEN.